US007044623B2

(12) United States Patent
Olsson et al.

(10) Patent No.: US 7,044,623 B2
(45) Date of Patent: May 16, 2006

(54) THRU-HULL LIGHT

(75) Inventors: Mark S. Olsson, La Jolla, CA (US); Zachary B. Simmons, Escondido, CA (US); Jeffrey A. Prsha, San Diego, CA (US); Ronan T. Gray, San Diego, CA (US); Ray Merewether, La Jolla, CA (US)

(73) Assignee: DeepSea Power & Light, San Diego, CA (US)

( * ) Notice: Subject to any disclaimer, the term of this patent is extended or adjusted under 35 U.S.C. 154(b) by 34 days.

(21) Appl. No.: 10/718,985

(22) Filed: Nov. 21, 2003

(65) Prior Publication Data

US 2005/0111222 A1 May 26, 2005

(51) Int. Cl.
*B60Q 1/00* (2006.01)
*F21V 1/00* (2006.01)

(52) U.S. Cl. ...................... 362/477; 362/310; 362/374; 362/375; 114/343; 114/382

(58) Field of Classification Search ................. 362/96, 362/101, 253, 373, 374–375, 477, 267, 310; 114/343, 382
See application file for complete search history.

(56) References Cited

U.S. PATENT DOCUMENTS

| | | | | | |
|---|---|---|---|---|---|
| 2,593,171 | A | * | 4/1952 | Morse | 362/477 |
| 4,104,620 | A | * | 8/1978 | Cronin | 340/642 |
| 4,145,075 | A | * | 3/1979 | Holzmann | 285/81 |
| 4,219,871 | A | * | 8/1980 | Larrimore | 362/264 |
| 4,224,464 | A | * | 9/1980 | Bunnell et al. | 174/65 R |
| 4,245,281 | A | * | 1/1981 | Ziaylek, Jr. | 362/477 |
| 4,344,118 | A | * | 8/1982 | Rundquist et al. | 362/267 |
| 4,346,404 | A | * | 8/1982 | Gantenbrink | 348/81 |
| 4,360,859 | A | * | 11/1982 | Ziaylek, Jr. | 362/477 |
| 4,361,864 | A | * | 11/1982 | Spiro | 362/549 |
| 4,368,508 | A | * | 1/1983 | Gantenbrink | 362/267 |
| 4,445,163 | A | * | 4/1984 | Ziaylek, Jr. | 362/287 |
| 4,544,996 | A | * | 10/1985 | George | 362/238 |
| 4,599,540 | A | * | 7/1986 | Roberts | 313/570 |
| 4,782,430 | A | * | 11/1988 | Robbins et al. | 362/562 |
| 4,940,922 | A | * | 7/1990 | Schuda et al. | 315/246 |
| 4,954,932 | A | * | 9/1990 | Isenga | 362/477 |

(Continued)

OTHER PUBLICATIONS

"Alluminum and Stainless Steel Small Halogen Screwed Bulleyfs," Under Water Lights, Aug., 2002, 1 page.

(Continued)

*Primary Examiner*—Stephen Husar
*Assistant Examiner*—Jason Han
(74) *Attorney, Agent, or Firm*—Michael H. Jester

(57) ABSTRACT

A thru-hull fitting assembly is connected to the forward end of a hollow lamp housing for mounting to a hole in the hull of a vessel in a water-tight fashion. An HID or other lamp is mounted in the lamp housing and is surrounded by a reflector which may have an outer elliptical section and an inner parabolic section. A protective transparent window extends across the forward end of the lamp housing and is sealed thereto. The window may be made of sapphire to provide improved heat dissipation and to resist scratching during hull cleaning and breakage due to thermal shock and wave slap. A circuit may be connected to the lamp to provide over-heat protection, leak detection, as well as fault and power status indicators. Alternate embodiments utilize a solid light pipe or a hollow reflective tube to convey light from the lamp to the protective window.

89 Claims, 8 Drawing Sheets

U.S. PATENT DOCUMENTS

| | | | | | |
|---|---|---|---|---|---|
| 4,957,370 | A | * | 9/1990 | Tominaga et al. | 356/632 |
| 4,965,601 | A | * | 10/1990 | Canty | 396/19 |
| 4,977,418 | A | * | 12/1990 | Canty | 396/19 |
| 5,016,151 | A | * | 5/1991 | Mula | 362/267 |
| 5,045,978 | A | * | 9/1991 | Gargle | 362/101 |
| 5,045,983 | A | * | 9/1991 | Shields | 362/293 |
| 5,081,361 | A | * | 1/1992 | Rieger | 250/458.1 |
| 5,103,381 | A | * | 4/1992 | Uke | 362/560 |
| 5,323,090 | A | * | 6/1994 | Lestician | 315/291 |
| 5,418,420 | A | * | 5/1995 | Roberts | 313/114 |
| 5,456,499 | A | * | 10/1995 | Sharpe | 285/39 |
| 5,504,666 | A | * | 4/1996 | Carmichael | 362/294 |
| 5,672,004 | A | * | 9/1997 | Schmidt, Jr. | 362/421 |
| 5,721,465 | A | * | 2/1998 | Roberts | 313/46 |
| 5,748,816 | A | * | 5/1998 | Jaksic et al. | 385/39 |
| 5,800,041 | A | * | 9/1998 | Poggi | 362/101 |
| 5,803,579 | A | * | 9/1998 | Turnbull et al. | 362/516 |
| 5,825,954 | A | * | 10/1998 | Dunn et al. | 385/79 |
| 5,967,567 | A | * | 10/1999 | Nordstrom | 285/139.1 |
| 6,091,489 | A | * | 7/2000 | Welker | 356/241.1 |
| 6,100,921 | A | * | 8/2000 | Rowley | 348/81 |
| 6,115,060 | A | | 9/2000 | Rowley | 384/81 |
| 6,155,703 | A | * | 12/2000 | Rizkin et al. | 362/551 |
| 6,329,663 | B1 | * | 12/2001 | Terada | 250/492.1 |
| 6,350,043 | B1 | * | 2/2002 | Gloisten | 362/287 |
| 6,351,058 | B1 | * | 2/2002 | Roberts | 313/113 |
| 6,414,436 | B1 | * | 7/2002 | Eastlund et al. | 313/634 |
| 6,538,394 | B1 | * | 3/2003 | Volk et al. | 315/291 |
| 6,545,428 | B1 | * | 4/2003 | Davenport et al. | 315/276 |
| 6,604,481 | B1 | * | 8/2003 | Johnston | 114/183 R |
| 6,616,291 | B1 | * | 9/2003 | Love | 362/101 |
| 6,636,003 | B1 | * | 10/2003 | Rahm et al. | 315/179 |
| 6,638,088 | B1 | * | 10/2003 | Richardson | 439/242 |
| 6,791,275 | B1 | * | 9/2004 | Shackle | 315/129 |
| 2002/0085384 | A1 | * | 7/2002 | Tiesler-Wittig | 362/511 |

OTHER PUBLICATIONS

"Underwater Lights USA—large screwed light," Undersater Lights USA,LLC, (printed off Internet Sep. 30, 2003), 1 page.

"Underwater Lights USA—small screwed halogen light," Underwater Lights USA, LLC (printed off Internet Sep. 30, 2003), 1 page.

"Underwater Light USA—small screwed xenon light," Underwater Lights USA, LLC (printed off Internet Sep. 30, 2003) 1 page.

"Weld-in light for steel hulls," Underwater Lights USA, LLC (printed off Internet, undated) 1 page.

"Weld-in light for aluminum hulls," Underwater Lights USA, LLC (printed off Internet, undated) 1 page.

"Small screwed halogen for fiberglass hulls," Underwater Lights USA, LLC (printed off Internet, undated) 1 page.

"Small Screwed Xenon for Fiberglass Hulls," Underwater Lights USA, LLC (printed off Internet, undated) 1 page.

"Underwater Lights USA—large screwed light," Underwater Lights USA, LLC (printed off Internet, Sep. 30, 2003) 1 page.

"Advanced Marine Underwater Lighting," DBG Marine, Inc., (undated), 3 pages.

"Underwater Lighting All Stainless Steel Construction," Model #086UL, Apollo Lighting Studio, (undated), 2 pages.

* cited by examiner

THRU-HULL LIGHT

FIELD OF THE INVENTION

The present invention relates to illuminating devices, and more particularly, to lights that are designed to be mounted in a hole formed in the hull of a vessel for projecting a beam of light into the surrounding water.

BACKGROUND OF THE INVENTION

There are many night time situations in which it is desirable to illuminate the water around a ship, boat or other surface vessel from the vessel itself. This is often done with powerful search lights mounted on the bridge, cabin, deck or other structure of the vessel that illuminate the upper surface of the water. However, in many cases a greater degree of illumination beneath the water surface is desired which can only be achieved if the light source is underwater. For example, divers can more safely enter the water from a vessel and climb out of the water into a vessel during the night if the area beneath the hull of the vessel near the jump point, swim step or ladder is illuminated. Night time search and rescue operations can also be facilitated by illuminating the water beneath its surface. Logs and other obstacles floating near the surface can be more easily identified and avoided during evening cruises with an underwater beam of light projecting from the bow of a vessel. Night time underwater photography is facilitated by illuminating the water beneath the surface adjacent the vessel hull. Fish and other sea life can also be attracted at night using underwater illumination. Aesthetically pleasing lighting effects can also be generated by projecting one or more beams of light laterally from the hull of a surface vessel beneath the water line so that they are readily visible to passengers and crew.

It is not practical to permanently attach underwater lights to the exterior of the hull due to the excessive drag that would be created, not to mention the severe mechanical strains on such appendages at high velocities of vessel travel. It is also tedious and cumbersome to lower lights on lines and cables from the deck of the vessel. Accordingly, thru-hull lights have been developed and used which essentially comprise a cylindrical lamp housing having a forward end with a protective, transparent, window that is mounted in water-tight fashion in a hole in the vessel hull with a conventional through hull fitting. The lamp is mounted in the housing behind the transparent window and is powered with shore power at the dock or the vessel's onboard power system when away from the dock. Numerous problems have been encountered with prior art thru-hull lights that have heretofore been commercialized for use with surface vessels. Their high heat output can damage the portion of a fiberglass hull immediately adjacent to the cylindrical lamp housing. Their beam patterns have not been optimized. The windows of the prior art thru-hull lights are subject to scratching from hull cleaning and breakage due to thermal shock and wave slap. The electrical circuits of the prior art thru-hull lights have not had any protection against water leakage, any protection against galvanic action that can lead to rapid and excessive corrosion of their metal parts, nor any power status or fault indicators.

SUMMARY OF THE INVENTION

It is therefore an object of the present invention to provide a thru-hull light that will not overheat and damage the portion of a hull immediately adjacent to its cylindrical lamp housing.

It is another object of the present invention to provide a thru-hull light with an improved beam pattern that will provide both a long narrow beam and close up diff-use illumination adjacent the hull.

It is another object of the present invention to provide a thru-hull light with a protective transparent widow that is less subject to scratching from hull cleaning and breakage due to thermal shock and wave slap.

It is still another object of the present invention to provide a thru-hull light with an electrical circuit that can detect water leakage.

It is still another object of the present invention to provide a thru-hull light with an electrical circuit that can protect against galvanic action that can lead to rapid and excessive corrosion of their metal parts.

It is still another object of the present invention to provide a thru-hull light with an electrical circuit that can indicate power status and the existence of a fault.

Still another object of the present invention is to provide a thru-hull light that will produce a more aesthetically appealing beam pattern and color.

The thru-hull light of the present invention includes a lamp housing having a hollow interior that communicates with a forward end of the lamp housing. A thru-hull fitting assembly is connected to the forward end of the lamp housing for mounting the forward end of the lamp housing in a hole in the hull of a vessel in a water-tight fashion. A lamp is mounted in the interior of the lamp housing. A window extends across the forward end of the lamp housing for permitting light from the lamp to be transmitted through the window. A water-tight seal is provided between the window and the forward end of the lamp housing to prevent water from entering the interior of the lamp housing.

In accordance with one aspect of our invention, the window is made of sapphire, which is extremely hard and therefore resists scratching, and also resists breakage due to thermal shock and wave slap. Sapphire is highly transparent to infrared radiation, has a high degree of thermal conductivity, and allows the use of a thinner window that increases heat transfer and facilitates a more efficient beam. Greater infrared transparency also allows more thermal energy to be directly radiated from the lamp and not trapped in the housing where it would produce a greenhouse effect. The sapphire window allows the lamp housing to remain cooler and provides scratch resistance.

In accordance with another aspect of our invention, a reflector surrounds the lamp, which, in its preferred form, has an outer elliptical section and an inner parabolic section.

In accordance with another aspect of our invention an electrical circuit is connected to the lamp for shutting off a source of power to the lamp upon the detection of a predetermined excessive heat condition, thereby protecting adjacent regions of the hull from heat damage.

In accordance with another aspect of our invention an electrical circuit is connected to the lamp for shutting off a source of power to the lamp upon the detection of leakage of water into the lamp housing.

In accordance with another aspect of our invention an electrical circuit is connected to the lamp for shutting off a source of power to a ballast in the event of the detection of a fault in the lamp.

In accordance with another aspect of our invention an electrical circuit is connected to the lamp for indicating power status and/or fault status.

In accordance with another aspect of our invention the lamp has a color temperature of at least about five thousand K to produce a more aesthetically pleasing underwater illumination effect and provide greater range and penetration of light into the water.

In accordance with another aspect of our invention a light pipe is used to convey light from a lamp into the water surrounding the vessel.

In accordance with another aspect of our invention a reflective tube is used as a light pipe to convey illumination from the lamp into the water surrounding the vessel.

DESCRIPTION OF THE PREFERRED EMBODIMENT

Figure 1:
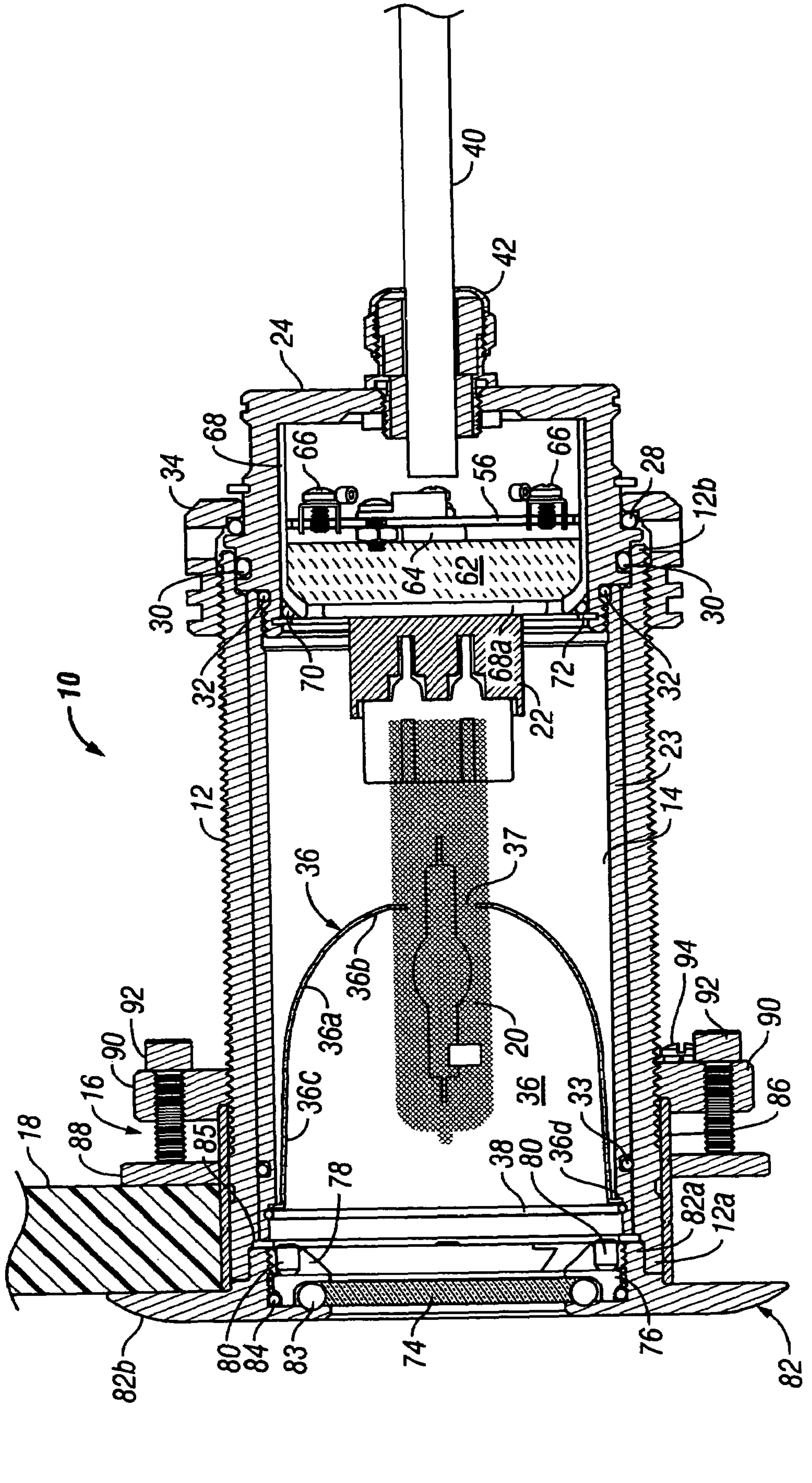
FIG. 1 is a cross-sectional view of a preferred embodiment of our thru-hull light.

Referring to FIG. 1, a thru-hull light 10 includes an externally male threaded cylindrical lamp housing 12 made of a corrosion resistant material such as bronze, stainless steel or titanium and having a hollow interior 14 that communicates with a forward end 12*a* of the lamp housing 12. A thru-hull fitting assembly 16 is connected to the forward end 12*a* of the lamp housing 12 for mounting the forward end 12*a* of the lamp housing 12 in a hole in the hull 18 of a vessel in a water-tight fashion. Only a portion of the hull 18 is illustrated on one side of the sectional view of FIG. 1. The hull 18 could be made of fiberglass, steel, aluminum, wood, concrete or any other material used to construct rigid boat hulls. A high intensity discharge (HID) lamp 20 is plugged into a lamp socket 22 mounted in the interior 14 of the lamp housing 12. By way of example, the lamp 20 may be an OSRAM SYLVANIA® HID one hundred and fifty watt lamp with a color temperature of seven thousand K. The lamp 20 preferably has a color temperature of at least about five thousand K to produce a more aesthetically pleasing blue light underwater illumination effect and greater underwater penetration. A cylindrical aluminum reflector holder 23 extends within the lamp housing 12 closely adjacent thereto. A cylindrical stainless steel, bronze or titanium end cap 24 is secured within the rearward end 12*b* of the lamp housing 12 and also within the rearward end of the reflector holder 23 via O-rings 28, 30 and 32 with O-ring 30 providing a water-tight seal. A female threaded cylindrical end cap retainer 34 also made of stainless steel or titanium secures the end cap 24 in position. The O-rings 28, 30 and 32 are preferably made of buna nitrile. Another O-ring 33 made of a similar material such as that sold under the trademark VITON® is seated in an annular groove formed in the exterior of the forward portion of the reflector holder 23 and is squeezed between the reflector holder 23 and the interior of the lamp housing 12.

A reflector 36 (FIG. 1) surrounds the lamp 20, which, in its preferred form, has an outer elliptical section 36*a* and an inner parabolic section 36*b*. The reflector 36 is preferably made of spun or drawn aluminum. The lamp 20 projects through a large aperture 37 in the center of the inner parabolic section 36*b* of the reflector 36. The benefits of the special configuration of the reflector 36 are described hereafter in detail in connection with the ray trace of FIG. 2. The reflector 36 has a generally cylindrical forward section 36*c* that terminates in a flange 36*d* that seats against a shoulder formed in the forward end of the cylindrical reflector 23 holder and is held in position by a stainless steel snap ring 38.

Figure 3:
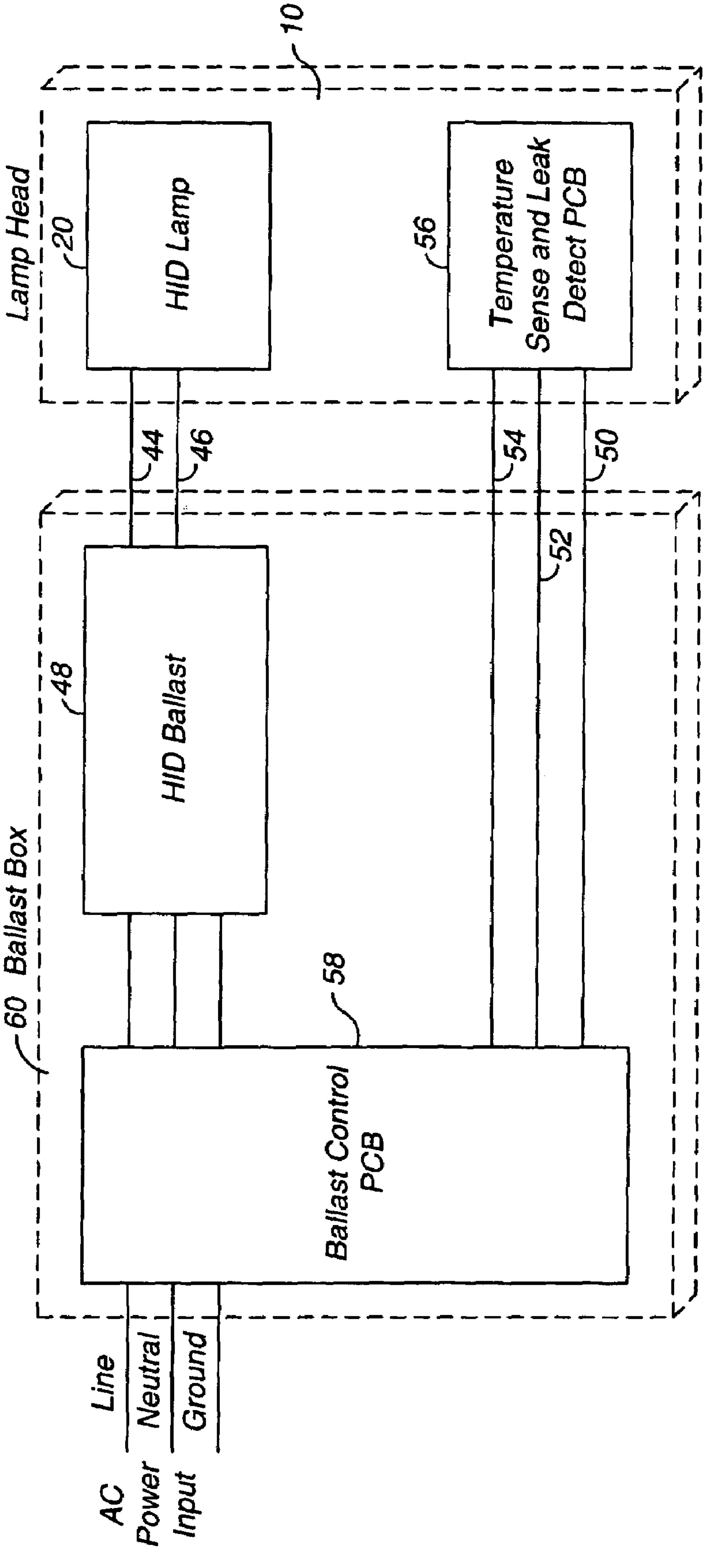
FIG. 3 is a functional block diagram of a preferred embodiment of a lighting system that incorporates the thru-hull light of FIG. 1.

A multi-conductor insulated and shielded cable 40 (FIG. 1) extends through a cable gland assembly 42 with a compression fitting that is mounted in a hole in the center of the end cap 24. Insulated wires 44 and 46 (FIG. 3) inside the cable 40 provide power to the lamp 20 from an HID ballast circuit 48. One suitable HID ballast circuit is the M 15012CK-3EU commercially available from NAIS. Three other insulated wires 50, 52 and 54 in the cable 40 are connected between a temperature sense and leak detection printed circuit board assembly 56 and a ballast control circuit printed circuit board assembly 58. The HID ballast circuit 48 and the ballast control printed circuit board assembly 58 are mounted in a separate ballast box 60 normally mounted in the vessel within fifteen to twenty feet of the thru-hull light 10 containing the lamp 20.

The temperature sense and leak detection printed circuit board assembly 56 (FIG. 3) is mounted within the end cap 24 behind an aluminum oxide insulator disc 62 (FIG. 1). Two ceramic stand off spacers 64 separate the insulator disc 62 and the circuit board assembly 56. The circuit board assembly 56 includes screw terminals such as 66 for connecting the wires (not illustrated in FIG. 1) from the cable 40. An ULTEM® polyimide thermal insulating cylinder 68 surrounds the circuit board assembly 56 within the end cap 24. The lamp socket 22 is mounted to a transverse end wall 68a of the insulating cylinder 68 and conductors (not illustrated) connect the individual lamp pin sockets of the lamp socket 22 to the circuit board assembly 56. An O-ring 70 is seated between the forward end of the thermal insulating cylinder 68 and the forward end of the end cap 24. The insulating cylinder 68 is held in position within the end cap 24 by a snap ring 72. The construction of the light 10 allows the lamp 20 to be replaced from within the hull of the vessel while the vessel is in the water and the light 10 situated below the water line.

Figure 2:
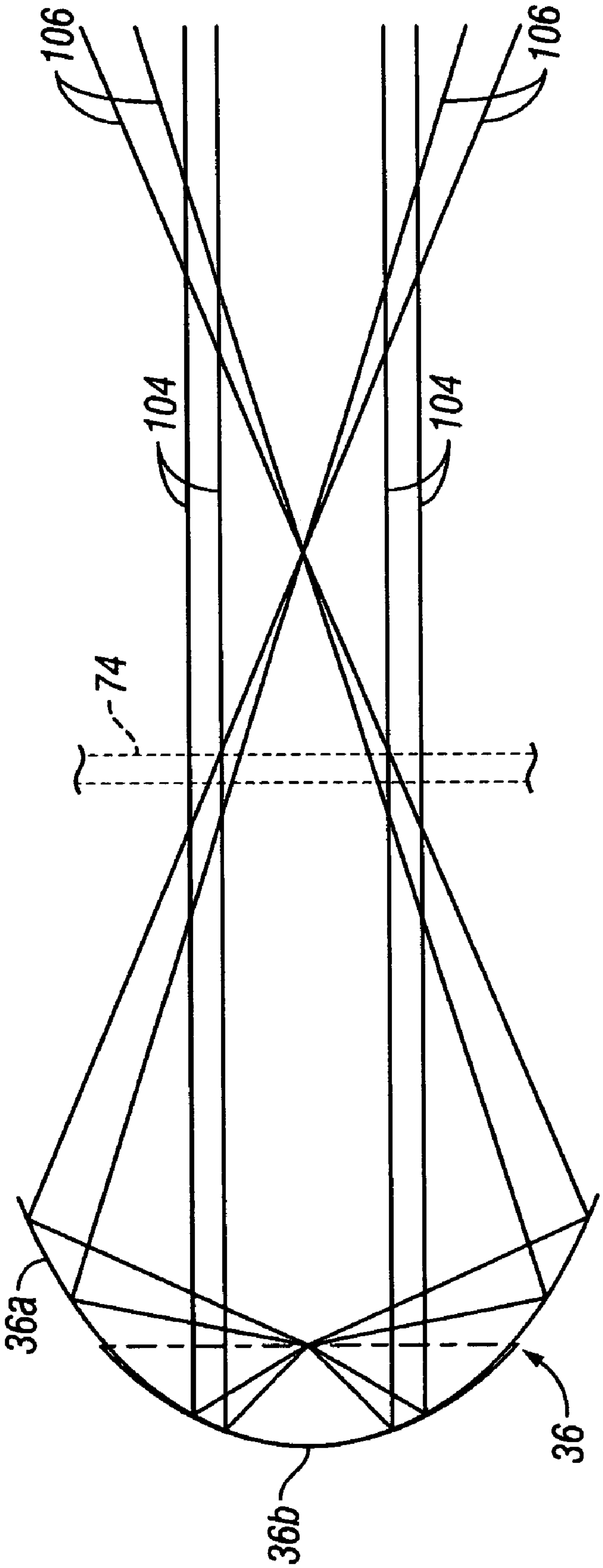
FIG. 2 is a ray trace of the reflector of the thru-hull light of FIG. 1.

A flat disc shaped window 74, shown diagrammatically as a dashed vertical line in FIG. 2, extends across the forward end 12*a* of the lamp housing 12 for permitting light from the lamp 20 to be transmitted through the window 74 and into the water surrounding the vessel. Referring again to FIG. 1, the window 74 is sandwiched between a brass sealing ring 76 on its rearward side and a metallic circular bezel 82 on its forward side. Metallic locking ring 78 has male threads which allow it to be screwed into female threads in the cylindrical portion 82*a* of the bezel 82 to press the sealing ring 76 against the window 74. Set screws 80 prevent the locking ring 78 from rotating. The smooth outer surface of the cylindrical portion 82*a* of the bezel 82 is welded to the forward end 12*a* of the lamp housing 12. Alternatively, the bezel 82 and the lamp housing could be fabricated from a single piece of material. O-rings 83 and 84 preferably made of VITON® high temperature resistant fluorocarbon material provide a water tight seal between the window 74, sealing ring 76 and the bezel 82. A water-tight seal is thereby provided between the window 74 and the forward end 12*a* of the lamp housing to prevent water from entering the interior of the lamp housing 12. A snap ring 85 is positioned between the forward end of the reflector holder 23 and the cylindrical portion 82*a* of the bezel 82. A plurality of cylindrical thermal insulating sleeves 86 surround the forward end 12*a* of the lamp housing 12.

The protective window 74 is preferably made of single crystal synthetic sapphire, which is extremely hard and therefore resists scratching from hull cleaning. The sapphire window 74 also resists breakage due to thermal shock and wave slap which can generate forces up to 500 psi. The sapphire window 74 also has substantial transparency to infrared radiation, compared to glass, so that a larger amount of heat generated by the energized lamp 20 can radiate through the window 74 into the relatively cool water on the other side of the window 74. By way of example, the sapphire window 74 may be 0.1875 inches thick. The protective window 74 need not be made of sapphire but could be made of quartz, glass or other suitable transparent material such as high temperature resistant plastic.

The thru-hull fitting assembly 16 (FIG. 1) includes the bezel 82 and an opposing stainless steel jacking plate 88. The flange portion 82*b* of the bezel 82 is positioned on the exterior of the hull 18 around the hole that has been cut through the hull for mounting the light 10. The jacking plate 88 is positioned on the opposite side of the hull 18 around the hole in the hull 18. A stainless steel, titanium, bronze or plastic jacking ring 90 having female threads is screwed over the forward male threaded exterior of the lamp housing 12 to the appropriate location depending upon the thickness of the hull 18. Six jacking bolts 92 (only two of which are visible in FIG. 1) can be screwed through threaded holes spaced about the jacking ring 90. The forward ends of the bolts 92 push against the jacking plate 88 so that the hull 18 is squeezed between the bezel flange portion 82*b* and the jacking plate 88. A screw 94 is threaded into another female threaded hole in the jacking ring 90 for securing a wire that connects to the vessel's galvanic corrosion prevention system.

Referring to the ray diagram of FIG. 2, the novel configuration of the reflector 36 includes an inner parabolic section 36*b* that surrounds the lamp 20 immediately adjacent thereto and an outer elliptical section 36*a*. The lamp 20 is preferably positioned longitudinally within the reflector 36 so that its arc gap is located at the common focus F of the outer elliptical section 36*a* and the inner parabolic section 36*b* and light is projected through the sapphire window 74 out into the water adjacent the hull 18 of the vessel. The inner parabolic section 3 6*b* produces a long, penetrating narrow beam illustrated diagrammatically by parallel ray paths 104. The outer diameter of the inner parabolic section 36*b* should be substantially equal to the diameter of the sapphire window 74. The outer elliptical section 36*a* has a second focus F' and results in diffuse, close-in illumination (adjacent the hull) illustrated diagrammatically by intersecting ray paths 106. Preferably the reflector 36 is configured so that the second focus F' is placed outside the lamp housing 12 as close as practical to the outside surface of the sapphire window 74. The shape and size of the reflector 36 must be designed so that light reflected from the lamp 20 by the reflector 36 will pass through a relatively small opening defined by the unobstructed portions of the sapphire window 74.

The ballast control circuit printed circuit board assembly 58 (FIG. 3) automatically shuts off the power to the lamp 20 upon the detection of a predetermined excessive heat condition, thereby protecting adjacent regions of the hull 18 from heat damage where the hull is made of fiberglass or wood. Instead of shutting off the power to the lamp, the power could be reduced in a feedback type of control to lower the operating temperature of the light 10, although this type of feedback regulation would be difficult to accomplish with the HID ballast circuit 48. Turning the power OFF, or reducing the power, are collectively referred to herein as "impeding" the power. Temperature is sensed in the lamp housing 12 via a thermistor or other temperature sensor mounted on the temperature sense and leak detection printed circuit board assembly 56.

Figure 4:
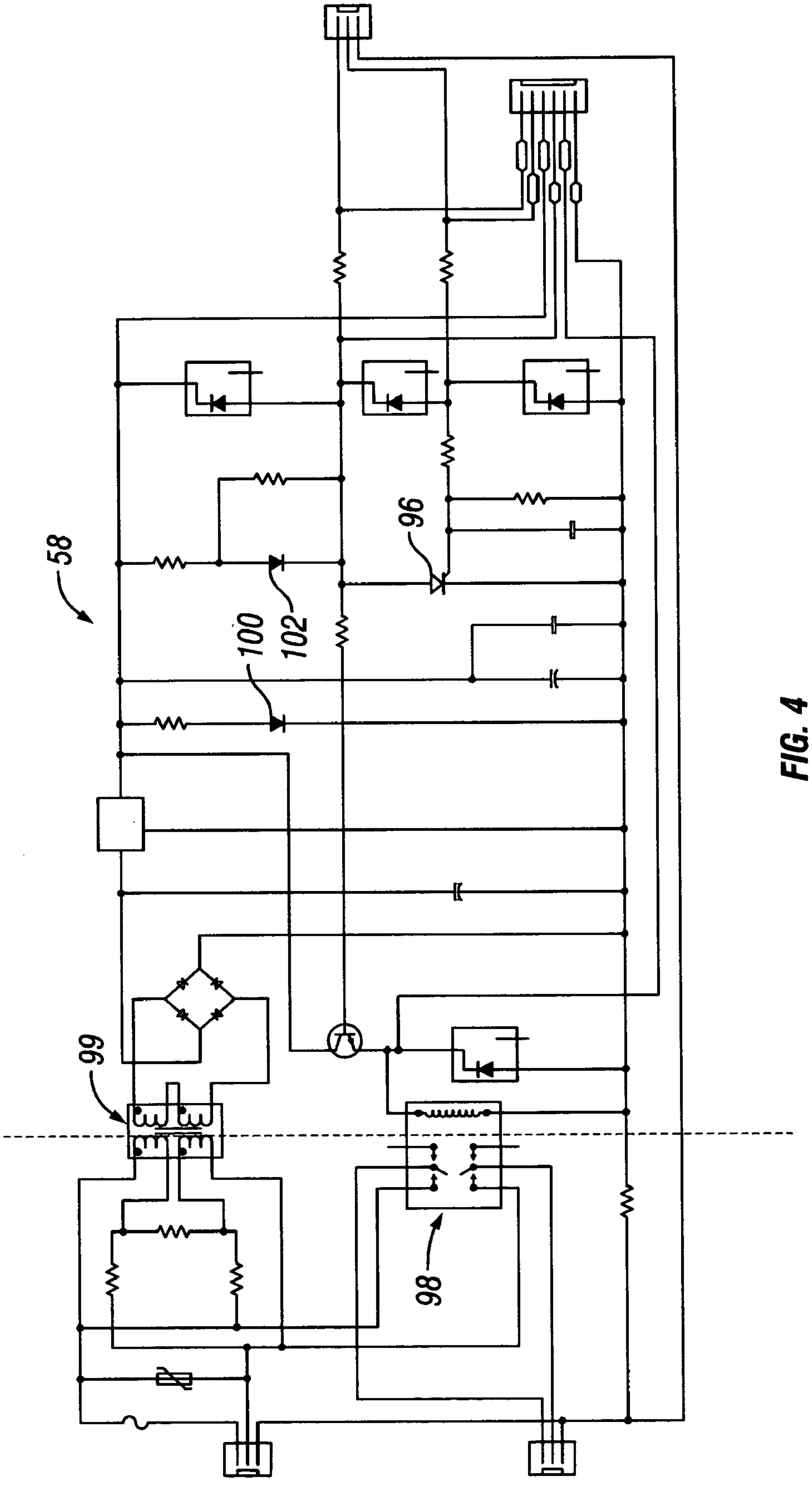
FIG. 4 is a schematic diagram of the ballast control circuit of the lighting system of FIG. 3.

The ballast control circuit printed circuit board assembly 58 also includes circuitry for shutting off power to the HID ballast circuit 48 and the lamp 20 upon the detection of leakage of water into the lamp housing 12. A leak is detected via a pair of electrodes or other water sensor mounted on the temperature sense and leak detection printed circuit board assembly 56. The ballast control circuit printed circuit board assembly 58 also includes circuitry for shutting off power to the HID ballast circuit 48 and the lamp 20 in the event of the detection of a fault in the lamp 20. FIG. 4 is a schematic diagram of the ballast control circuit on the printed circuit board assembly 58. A silicon controlled rectifier (SCR) 96 senses leak current and latches an "error" condition indicative of water in the lamp housing 12. A ballast power relay 98 disconnects the HID ballast circuit 48 and lamp 20 from the power if an overheat condition or a leak condition occurs. A transformer 99 provides power line isolation. An LED 100 in the ballast control circuit printed circuit board assembly 58 is illuminated to indicate that the AC power is ON. Another LED 102 is illuminated when either an excessive temperature or a leak has caused a power shut down.

The reflector 36 can be varied greatly in shape and configuration from spherical, to conical, to purely elliptical, to purely parabolic, or even eliminated altogether. The lamp housing 12 and the thru-hull fitting assembly 16 can be varied in shape, design and material, as well as the socket 22 and the various water-tight seals and the cable termination and circuit mounting. The forward end 12*a* of the lamp housing 12 could be directly bonded to, or otherwise affixed to, the hull 18 in a water-tight manner, thereby eliminating the need for the through hull fitting assembly 16. The lamp housing 12 need not have the end cap 24 and the lamp housing 12 could instead open to the interior space on the inside of the hull 18. The lamp 20 could be a halogen lamp, or an incandescent lamp, a flourescent lamp, a laser or an LED functioning as a lamp. The lamp 20 could also be a hybrid lamp of the type described hereafter in connection with the alternate embodiment of FIG. 8.

It should be understood that the term "thru-hull fitting assembly" generally refers to any type of structure for securing the forward end of the lamp housing to a hole in the hull of a vessel in a water-tight fashion, including those described herein and equivalents, such as those described hereafter. Where the hull is steel the forward end of a steel lamp housing could be welded directly to the periphery of the hole through the hull, eliminating the need for additional parts such as the jacking plate 88 and jacking ring 90. Where the hull is fiberglass, the forward end of a plastic lamp housing could be solvent welded to the periphery of the hole in the hull.

Figure 5:
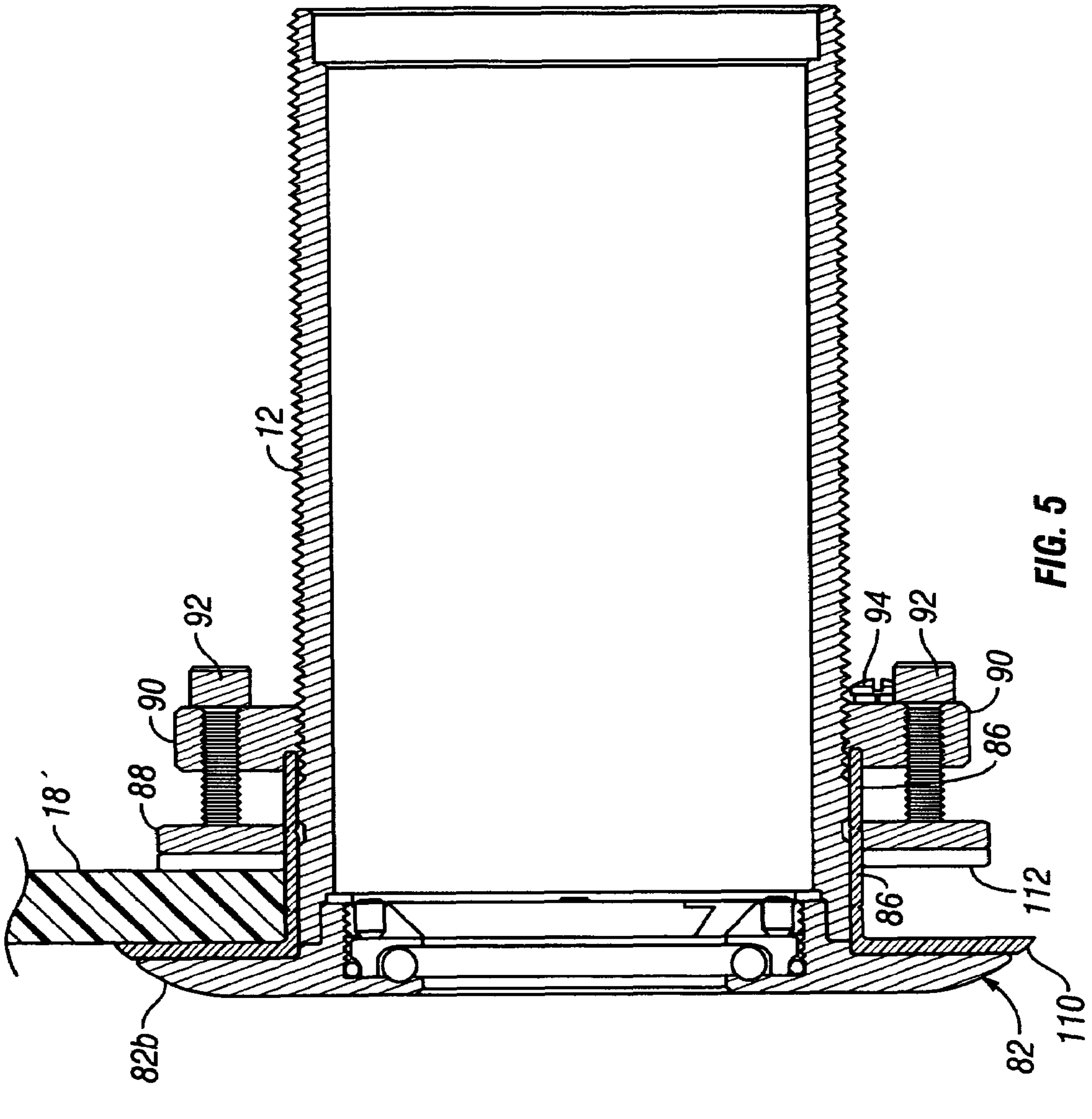
FIG. 5 is a cross-sectional view of the lamp housing of the thru-hull light illustrating an alternate thru-hull fitting assembly that provides improved corrosion resistance.

FIG. 5 is a cross-sectional view of the lamp housing 12 of the thru-hull light illustrating an alternate thru-hull fitting assembly that provides improved corrosion resistance. Metal hulled vessels require special attention when attaching thru-hull fitting assemblies below the water line. Stray currents drive galvanic corrosion to unacceptably high rates. This can be avoided by electrically disconnecting the thru-hull fitting assembly from the metal hull and by connecting the fitting assembly itself to the vessel's active galvanic protection system. The former is accomplished by using a dielectric hull shoulder washer 110 and a ring-shaped dielectric hull contact plate 112 along with the thermal insulating sleeves 86 to ensure that none of the metal parts of the thru-hull light 10 contact the metal hull 18. The hull contact plate 112 and the thermal insulators 86 are preferably made of NYLON® plastic while the hull shoulder washer 110 is preferably made of ULTEM® polyimide.

Figure 6:
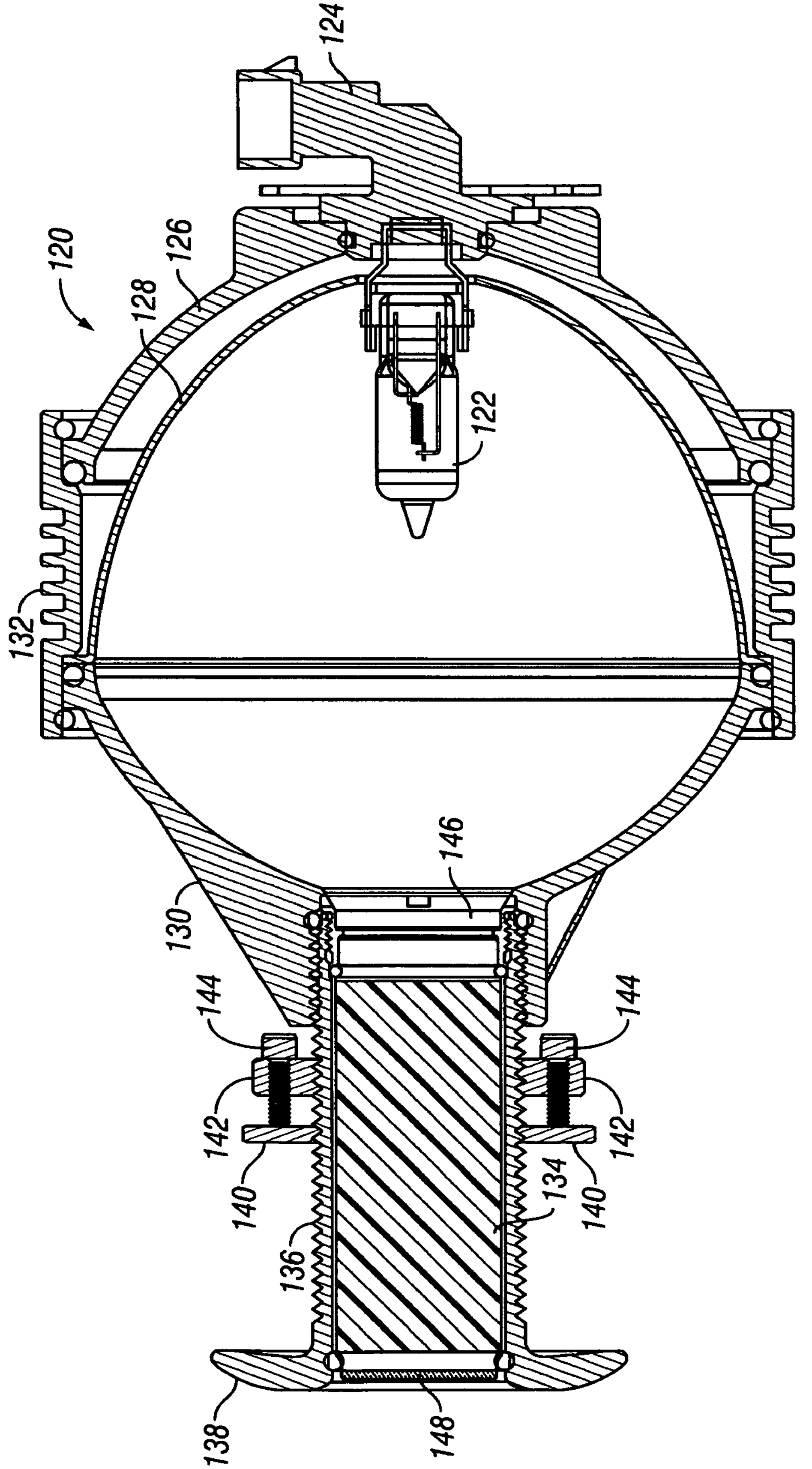
FIG. 6 is a cross-sectional view of an alternate embodiment of our thru-hull light with a solid plastic light pipe.

FIG. 6 is a cross-sectional view of an alternate embodiment 120 of our thru-hull light. An incandescent lamp 122 is supported by a socket assembly 124 mounted in a first hemispherical housing portion 126. The lamp 122 is surrounded by a reflector 128 mounted inside the housing portion 126 and having a forward lip that mates with a second hemispherical housing portion 130. The two housing portions 126 and 130 are joined by a ribbed cylindrical collar 132. An elongated light pipe in the form of a solid cylindrical acrylic rod 134 is mounted inside a male threaded cylindrical light pipe housing 136 whose rearward end is threaded into a female threaded socket in the forward end of the housing portion 130. The light pipe housing 136 effectively forms part of the lamp housing that also includes the two housing portions 126 and 130 and the collar 132. A flange 138 is integrally formed to the forward end of the light pipe housing 136. The flange 138 overlies the outside surface of the vessel hull (not illustrated) and the male threaded portion of the housing 136 extends through a suitably sized hole in the vessel's hull. A backing plate 140 is pressed against the inner side of the hull via a jacking plate 142 screwed over the light pipe housing 136 using bolts 144, similar to the arrangement used with the thru-hull light 10 of FIG. 1. Various O-rings illustrated in FIG. 6 provide the water-tight seals required to prevent water from entering the interior of the thru-hull light 120. The use of the elongated light pipe 134 allows the heat from the lamp 122 to be spaced further away from the vessel's hull and the light collecting optics of the thru-hull light 120 are not limited by the size of the thru-hull fitting assembly or the size of the hole in the vessel's hull. This allows a small hole in the vessel's hull, which is essentially plugged by the light pipe 134. A hot mirror 146 is positioned over the rearward end of the light pipe 134 to reflect infrared energy away form the light pipe 134. This permits the light pipe 134 to be made of inexpensive, high refractive index, transparent thermoplastic materials such as acrylic. However, it should be understood that the light pipe 134 could be made of a wide variety of suitable transparent materials including glass, quartz and sapphire. A hard cover or window 148 made of sapphire or other suitable scratch resistant transparent material is optionally positioned over the outside facing forward end of the light pipe 134 to prevent damage from hull cleaning equipment.

Figure 7:
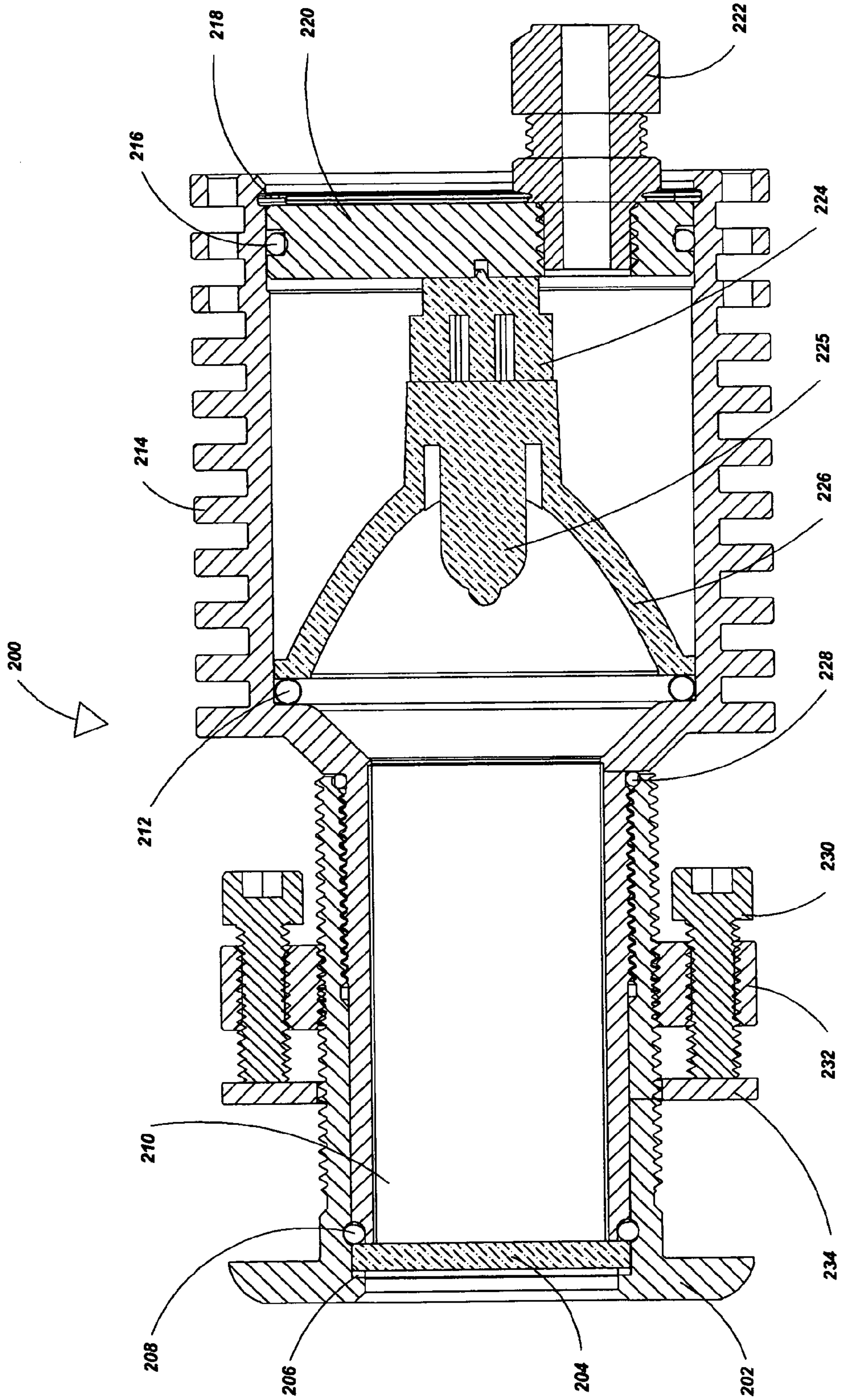
FIG. 7 is a cross-sectional view of an alternate embodiment of our thru-hull light with a reflective tube used as a light pipe to convey light from a halogen lamp.

FIG. 7 is a cross-sectional view of an alternate embodiment of our thru-hull light 200 with a hollow reflective tube 210 used as a light pipe to convey light from a halogen lamp 225. The lamp 225 is plugged into a ceramic receptacle 224 and is surrounded by a glass reflector 226. The inner surface of the reflector 226 has a dichromic or half-wave coating (not illustrated) that allows infrared radiation from the lamp to radiate rearwardly there through while projecting most of the visible light forwardly from the lamp 225 through the reflective tube 210. The reflective tube 210 has a highly reflective polish or coating on its inner surface such as found on 1150 Aluminum alloy. The reflective surface may also be provided by electroplating or anodizing the inner surface of a metallic tube. Where the lamp 225 has a sufficiently low wattage, the inner surface of the tube 210 may be coated with a metallized plastic film to provide a high degree of reflectivity.

Referring still to FIG. 7, the thru-hull light 200 has a ribbed metallic rear housing 214 whose rearward end is sealed via end cap 220, O-ring 216 and snap ring 218. A cable clamp 222 screws into a through bore in the end cap 220 to provide a sealed passage way for the required electrical wires (not illustrated). The lamp socket 224 is supported by the end cap 220. The forward end of the reflector 226 seats against a wire mesh gasket 212. A thru-hull fitting assembly including bezel 202, jacking plate 234,jacking ring 232 and jacking screws 230 is used to mount the forward end of the lamp housing in a hole in the hull of a vessel. The bezel 202 has a female threaded cylindrical portion that screws over a male threaded outer segment of the reflective tube 210. The cylindrical portion of the bezel 202 forms the forward part of the lamp housing that supports and encloses the reflective tube 210. The jacking plate 234 slides freely over the outer male threads on the cylindrical portion of the bezel 202 while the jacking ring 232 screws over the same. A sapphire window 204 is mounted within the bezel 202 and front gasket 206 and O-ring 208 provide the required water-tight seal. Another O-ring 228 at the rear end of the cylindrical portion of the bezel 202 provides a water-tight seal at the rear end of the reflective tube 210. It may be desirable to coat the inwardly tapering surface of the rear housing 214 that bridges the gap between the forward end of the reflector 226 and the reflective tube 210 to ensure that the maximum amount of visible light from the lamp 225 is ultimately conveyed through the window 204.

Figure 8:
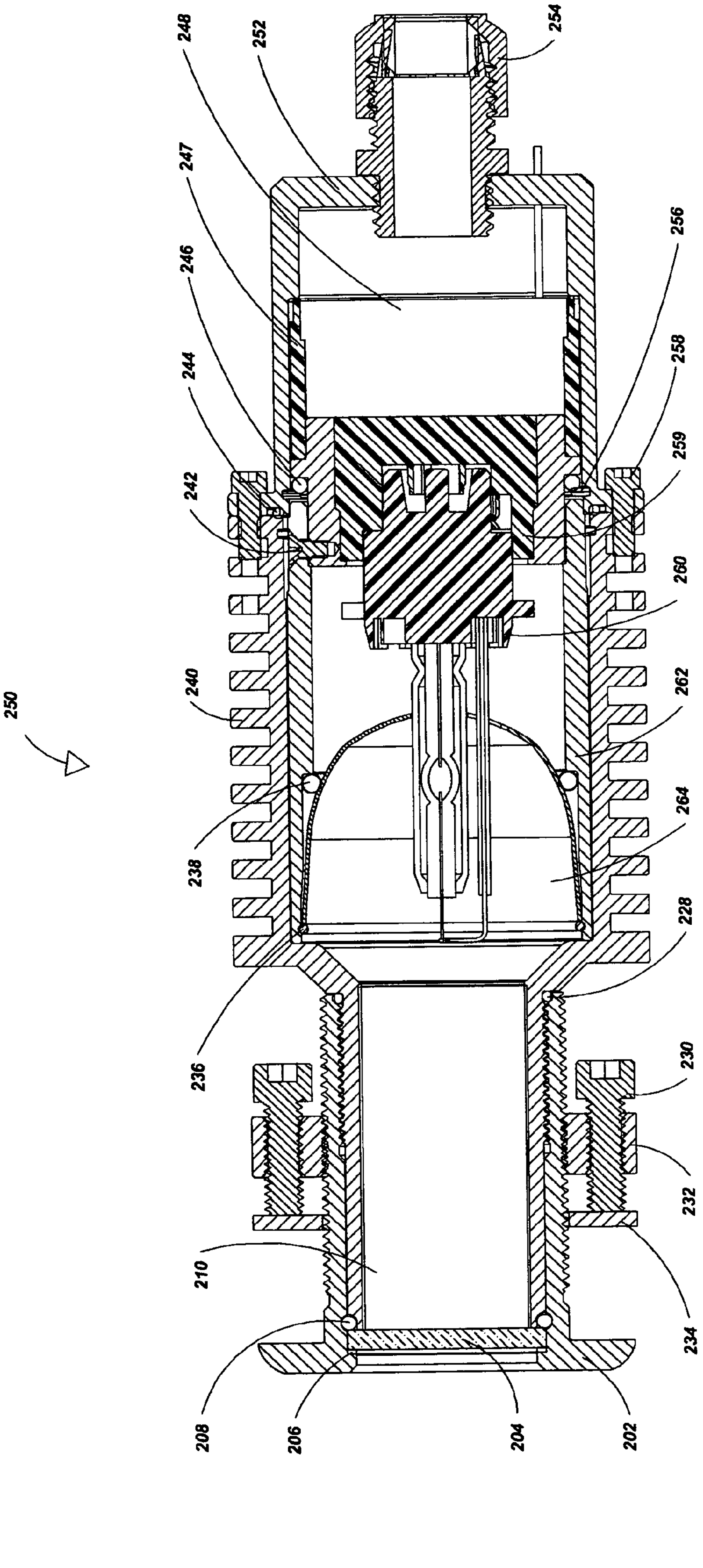
FIG. 8 is a cross-sectional view of an alternate embodiment of our thru-hull light with a reflective tube used as a light pipe to convey light from a hybrid Xenon/HID lamp.

FIG. 8 is a cross-sectional view of an alternate embodiment of our thru-hull light 250 which is similar in many respects to the thru-hull light 200 as indicated by the like reference numerals which denote like parts. The hollow reflective tube 210 is used as a light pipe to convey light from a hybrid Xenon/HID lamp 260 of the type recently introduced in automobile headlamps and sometimes referred to as a D2 lamp. The base of the lamp 260 plugs into a socket assembly 259 connected to an ignitor assembly 248. A plastic thermal insulating sleeve 247 surrounds the socket assembly 259 and the ignitor assembly 258. The glass envelope (illuminating) portion of the lamp 260 is surrounded by a reflector 264 having an inner parabolic section and an outer elliptical section. Screws such as 242 secure the socket assembly 259 in position within a ribbed rear lamp housing 240. An end cap 252 with a cable clamp 254 is secured to the rear lamp housing 240 via screws 258 with mechanical interface being provided by snap ring 256 and O-rings 244 and 246. The reflector 264 is held in position via reflector holder 262, wire mesh gasket 238 and reflector retainer 236.

While we have described several embodiments of our invention in detail, modifications and adaptations thereof will occur to those skilled in the art. In lieu of a lamp, a plurality of LEDs could be arranged to produce variable output colors as desired by the user. Green or blue lasers could provide either a single narrow beam or multiple beams using a galvanometer slewed mirror to produce a fan beam or other unique patterns in the water. Lasers could also be used in a line scan imaging system. Strobe lamps could be mounted in the housing to act as a warning or homing beacon or to provide illumination for underwater photography. Other adaptations of our thru-hull light include the integration of an optical Doppler speed log into the housing, the use of pulsed lasers, imaging speed logs, and hull-mounted suspended particle counting. Multiple such illuminating devices could be mounted behind the protective window. The over-heat, leak detection, ballast shut-off, power indicator and fault indicator circuits are not essential, although desirable. The lamp could be replaced with a camera or there could be a combination of a camera and a device for illuminating the field of view of the camera. Therefore, the protection afforded our invention should only be limited in accordance with the scope of the following claims.

We claim:

1. A thru-hull light comprising:

a lamp housing having a hollow interior;

a thru-hull clamping assembly connected to a forward end of the lamp housing for mounting the forward end of the lamp housing in a hole in the hull of a vessel in a water-tight fashion by squeezing the hull;

a lamp;

means for mounting the lamp in the interior of the lamp housing;

a sapphire window extending across the forward end of the lamp housing for permitting light from the lamp to be transmitted through the window; and means for providing a water-tight seal between the sapphire window and the forward end of the lamp housing to prevent water from entering the interior of the lamp housing.

2. The thru-hull light of claim 1 and further comprising a reflector mounted in the interior of the lamp housing and surrounding the lamp.

3. The thru-hull light of claim 2 wherein the reflector has an outer elliptical section.

4. The thru-hull light of claim 2 wherein the reflector has an outer elliptical section and an inner parabolic section.

5. The thru-hull light of claim 1 and further comprising an end cap and means for securing the end cap to a rearward end of the lamp housing in a water-tight fashion.

6. The thru-hull light of claim 1 and further comprising an electrical circuit connected to the lamp and including means for shutting off a source of power to the lamp upon the detection of a predetermined excessive heat condition.

7. The thru-hull light of claim 1 and further comprising an electrical circuit connected to the lamp and including means for shutting off a source of power to the lamp upon the detection of leakage of water into the lamp housing.

8. The thru-hull light of claim 1 and further comprising an electrical circuit connected to the lamp and including a ballast and means for shutting off a source of power to the ballast in the event of the detection of a fault in the lamp.

9. The thru-hull light of claim 8 wherein the electrical circuit further includes means for indicating power status and/or fault status.

10. The thru-hull light of claim 1 wherein the lamp has a color temperature of at least about five thousand K.

11. A thru-hull light comprising:

a lamp housing having a hollow interior;

a thru-hull clamping assembly connected to a forward end of the lamp housing for mounting the forward end of the lamp housing in a hole in the hull of a vessel in a water-tight fashion by squeezing the hull;

a lamp;

means for mounting the lamp in the interior of the lamp housing;

a reflector mounted in the interior of the lamp housing and having an elliptical section surrounding the lamp;

a window extending across the forward end of the lamp housing for permitting light from the lamp to be transmitted through the window; and means for providing a water-tight seal between the window and the forward end of the lamp housing to prevent water from entering the interior of the lamp housing.

12. The thru-hull light of claim 11 wherein the window is made of a material selected from the group consisting of sapphire, quartz and glass.

13. The thru-hull light of claim 11 wherein the means for mounting the lamp includes a socket.

14. The thru-hull light of claim 11 wherein the reflector also has an inner parabolic section surrounded by the elliptical section, the inner parabolic section having an outer diameter substantially equal to a diameter of the window.

15. The thru-hull light of claim 11 and further comprising an end cap and means for securing the end cap to a rearward end of the lamp housing in a water-tight fashion.

16. The thru-hull light of claim 11 and further comprising an electrical circuit connected to the lamp and including means for shutting off a source of power to the lamp upon the detection of a predetermined excessive heat condition.

17. The thru-hull light of claim 11 and further comprising an electrical circuit connected to the lamp and including means for shutting off a source of power to the lamp upon the detection of leakage of water into the lamp housing.

18. The thru-hull light of claim 11 and further comprising an electrical circuit connected to the lamp and including a ballast and means for shutting off a source of power to the ballast in the event of the detection of a fault in the lamp.

19. The thru-hull light of claim 18 wherein the electrical circuit further includes means for indicating power status and/or fault status.

20. The thru-hull light of claim 11 wherein the lamp has a color temperature of at least about five thousand K.

21. A thru-hull light comprising:

a lamp housing having a hollow interior;

a thru-hull clamping assembly connected to a forward end of the lamp housing for mounting the forward end of the lamp housing in a hole in the hull of a vessel in a water-tight fashion by squeezing the hull;

a lamp;

means for mounting the lamp in the interior of the lamp housing;

a window extending across the forward end of the lamp housing for permitting light from the lamp to be transmitted through the window;

means for providing a water-tight seal between the window and the forward end of the lamp housing to prevent water from entering the interior of the lamp housing; and an electrical circuit connected to the lamp and including means for shutting off a source of power to the lamp upon the detection of a predetermined excessive heat condition.

22. The thru-hull light of claim 21 and further comprising a reflector mounted in the interior of the lamp housing and surrounding the lamp.

23. The thru-hull light of claim 22 wherein the reflector has an inner parabolic section.

24. The thru-hull light of claim 22 wherein the reflector has an outer elliptical section.

25. The thru-hull light of claim 21 and further comprising an end cap and means for securing the end cap to a rearward end of the lamp housing in a water-tight fashion.

26. The thru-hull light of claim 21 wherein the window is made of a material selected from the group consisting of sapphire, quartz and glass.

27. The thru-hull light of claim 21 wherein the electrical circuit connected to the lamp further includes means for shutting off a source of power to the lamp upon the detection of leakage of water into the lamp housing.

28. The thru-hull light of claim 21 wherein the electrical circuit connected to the lamp further includes a ballast and means for shutting off a source of power to the ballast in the event of the detection of a fault in the lamp.

29. The thru-hull light of claim 28 wherein the electrical circuit connected to the lamp further includes means for indicating power status and/or fault status.

30. The thru-hull light of claim 21 wherein the lamp has a color temperature of at least about five thousand K.

31. A thru-hull light comprising:

a lamp housing having a hollow interior;

a thru-hull clamping assembly connected to a forward end of the lamp housing for mounting the forward end of the lamp housing in a hole in the hull of a vessel in a water-tight fashion by squeezing the hull;

a lamp;

means for mounting the lamp in the interior of the lamp housing;

a window extending across the forward end of the lamp housing for permitting light from the lamp to be transmitted through the window;

means for providing a water-tight seal between the window and the forward end of the lamp housing to prevent water from entering the interior of the lamp housing; and an electrical circuit connected to the lamp and including means for shutting off a source of power to the lamp upon the detection of leakage of water into the lamp housing.

32. The thru-hull light of claim 31 and further comprising a reflector mounted in the interior of the lamp housing and surrounding the lamp.

33. The thru-hull light of claim 32 wherein the reflector has an outer elliptical section.

34. The thru-hull light of claim 32 wherein the reflector has an inner parabolic section.

35. The thru-hull light of claim 31 and further comprising an end cap and means for securing the end cap to a rearward end of the lamp housing in a water-tight fashion.

36. The thru-hull light of claim 31 wherein the window is made of a material selected from the group consisting of sapphire, quartz and glass.

37. The thru-hull light of claim 31 wherein the electrical circuit connected to the lamp further includes means for shutting off a source of power to the lamp upon the detection of a predetermined excessive heat condition.

38. The thru-hull light of claim 31 wherein the electrical circuit connected to the lamp further includes a ballast and means for shutting off a source of power to the ballast in the event of the detection of a fault in the lamp.

39. The thru-hull light of claim 38 wherein the electrical circuit connected to the lamp further includes means for indicating power status and/or fault status.

40. The thru-hull light of claim 31 wherein the lamp has a color temperature of at least about five thousand K.

41. A thru-hull light comprising:

a lamp housing having a hollow interior;

a thru-hull clamping assembly connected to a forward end of the lamp housing for mounting the forward end of the lamp housing in a hole in the hull of a vessel in a water-tight fashion by squeezing the hull;

a lamp;

means for mounting the lamp in the interior of the lamp housing;

a window extending across the forward end of the lamp housing for permitting light from the lamp to be transmitted through the window;

means for providing a water-tight seal between the window and the forward end of the lamp housing to prevent water from entering the interior of the lamp housing; and an electrical circuit connected to the lamp and including a ballast and means for shutting off a source of power to the ballast in the event of the detection of a fault in the lamp.

42. The thru-hull light of claim 41 and further comprising a reflector mounted in the interior of the lamp housing and surrounding the lamp.

43. The thru-hull light of claim 42 wherein the reflector has an inner parabolic section.

44. The thru-hull light of claim 42 wherein the reflector has an outer elliptical section.

45. The thru-hull light of claim 41 and further comprising an end cap and means for securing the end cap to a rearward end of the lamp housing in a water-tight fashion.

46. The thru-hull light of claim 41 wherein the window is made of a material selected from the group consisting of sapphire, quartz and glass.

47. The thru-hull light of claim 41 wherein the electrical circuit connected to the lamp further includes means for shutting off a source of power to the lamp upon the detection of a predetermined excessive heat condition.

48. The thru-hull light of claim 41 wherein the electrical circuit connected to the lamp further includes means for shutting off a source of power to the lamp upon the detection of leakage of water into the lamp housing.

49. The thru-hull light of claim 41 wherein the electrical circuit connected to the lamp further includes means for indicating power status and/or fault status.

50. The thru-hull light of claim 41 wherein the lamp has a color temperature of at least about five thousand K.

51. A thru-hull light comprising:

a lamp housing having a hollow interior;

a thru-hull clamping assembly connected to a forward end of the lamp housing for mounting the forward end of the lamp housing in a hole in the hull of a vessel in a water-tight fashion by squeezing the hull;

a lamp;

means for mounting the lamp in the interior of the lamp housing;

a window extending across the forward end of the lamp housing for permitting light from the lamp to be transmitted through the window;

means for providing a water-tight seal between the window and the forward end of the lamp housing to prevent water from entering the interior of the lamp housing; and an electrical circuit connected to the lamp and including a ballast and means for indicating power status and/or fault status.

52. The thru-hull light of claim 51 and further comprising a reflector mounted in the interior of the lamp housing and surrounding the lamp.

53. The thru-hull light of claim 52 wherein the reflector has an inner parabolic section.

54. The thru-hull light of claim 52 wherein the reflector has an outer elliptical section.

55. The thru-hull light of claim 51 and further comprising an end cap and means for securing the end cap to a rearward end of the lamp housing in a water-tight fashion.

56. The thru-hull light of claim 51 wherein the window is made of a material selected from the group consisting of sapphire, quartz and glass.

57. The thru-hull light of claim 51 wherein the electrical circuit connected to the lamp further includes means for shutting off a source of power to the lamp upon the detection of a predetermined excessive heat condition.

58. The thru-hull light of claim 51 wherein the electrical circuit connected to the lamp further includes means for shutting off a source of power to the lamp upon the detection of leakage of water into the lamp housing.

59. The thru-hull light of claim 51 wherein the electrical circuit connected to the lamp further includes means for shutting off a source of power to the ballast in the event of the detection of a fault in the lamp.

60. The thru-hull light of claim 51 wherein the lamp has a color temperature of at least about five thousand K.

61. A thru-hull light comprising:

a lamp housing having a hollow interior;

a thru-hull clamping assembly connected to the forward end of the lamp housing for mounting the forward end of the lamp housing in a hole in the hull of a vessel in a water-tight fashion by squeezing the hull;

a lamp having a color temperature of at least about five thousand K;

means for mounting the lamp in the interior of the lamp housing;

a window extending across the forward end of the lamp housing for permitting light from the lamp to be transmitted through the window; and means for providing a water-tight seal between the window and the forward end of the lamp housing to prevent water from entering the interior of the lamp housing.

62. The thru-hull light of claim 61 and further comprising a reflector mounted in the interior of the lamp housing and surrounding the lamp.

63. The thru-hull light of claim 62 wherein the reflector has an inner parabolic section.

64. The thru-hull light of claim 62 wherein the reflector has an outer elliptical section.

65. The thru-hull light of claim 61 and further comprising an end cap and means for securing the end cap to a rearward end of the lamp housing in a water-tight fashion.

66. The thru-hull light of claim 61 and further comprising an electrical circuit connected to the lamp and including means for impeding a source of power to the lamp upon the detection of a predetermined excessive heat condition.

67. The thru-hull light of claim 61 and further comprising an electrical circuit connected to the lamp and including means for shutting off a source of power to the lamp upon the detection of leakage of water into the lamp housing.

68. The thru-hull light of claim 61 and further comprising an electrical circuit connected to the lamp and including a ballast and means for shutting off a source of power to the ballast in the event of the detection of a fault in the lamp.

69. The thru-hull light of claim 68 wherein the electrical circuit further includes means for indicating power status and/or fault status.

70. The thru-hull light of claim 61 wherein the window is made of a material selected from the group consisting of sapphire, quartz and glass.

71. A thru-hull light comprising:

a lamp housing having a hollow interior;

a thru-hull clamping assembly connected to a forward end of the lamp housing for mounting the forward end of the lamp housing in a hole in the hull of a vessel in a water-tight fashion by squeezing the hull;

a lamp;

a reflector mounted in the interior of the lamp housing and surrounding the lamp;

means for mounting the lamp in the interior of the lamp housing;

a sapphire window extending across the forward end of the lamp housing for permitting light from the lamp to be transmitted through the window;

means for providing a water-tight seal between the sapphire window and the forward end of the lamp housing to prevent water from entering the interior of the lamp housing; and an electrical circuit connected to the lamp and including means for shutting off a source of power to the lamp upon the detection of a predetermined excessive heat condition or upon the detection of leakage of water into the lamp housing.

72. A thru-hull light comprising:

a lamp housing having a hollow interior;

a lamp;

means for mounting the lamp in the interior of a first portion of the lamp housing;

a light pipe for conveying light from the lamp;

a second portion of the lamp housing supporting the light pipe; and a thru-hull clamping assembly connected to a forward end of the second portion of the lamp housing for mounting the forward end of the second portion of the lamp housing in a hole in the hull of a vessel in a water-tight fashion by squeezing the hull.

73. The thru-hull light of claim 72 and further comprising a reflector mounted in the interior of the first portion of the lamp housing and surrounding the lamp.

74. The thru-hull light of claim 72 and further comprising a hot mirror positioned over a rear end of the light pipe that faces the lamp.

75. The thru-hull light of claim 72 and further comprising a window made of a scratch resistant material positioned over a forward end of the light pipe that faces the water when the thru-hull light is installed in a vessel below the water line.

76. A thru-hull light comprising:

a lamp housing having a hollow interior;

a thru-hull clamping assembly connected to a forward end of the lamp housing for mounting the forward end of the lamp housing in a hole in the hull of a vessel in a water-tight fashion by squeezing the hull;

a lamp;

a reflector mounted in the interior of the lamp housing and surrounding the lamp and having a hybrid inner parabolic section and an outer elliptical section;

means for mounting the lamp in the interior of the lamp housing;

a window extending across the forward end of the lamp housing for permitting light from the lamp to be transmitted through the window; and means for providing a water-tight seal between the window and the forward end of the lamp housing to prevent water from entering the interior of the lamp housing.

77. A thru-hull light comprising:

a lamp housing having a hollow interior;

a thru-hull clamping assembly connected to a forward end of the lamp housing for mounting the forward end of the lamp housing in a hole in the hull of a vessel in a water-tight fashion by squeezing the hull;

a lamp;

means for mounting the lamp in the interior of the lamp housing;

a window extending across the forward end of the lamp housing for permitting light from the lamp to be transmitted through the window;

at least one thermal insulating sleeve surrounding the forward end of the lamp housing; and means for providing a water-tight seal between the window and the forward end of the lamp housing to prevent water from entering the interior of the lamp housing.

78. A thru-hull light comprising:

a lamp housing having a hollow interior;

a lamp;

means for mounting the lamp in the interior of a first portion of the lamp housing;

a hollow reflective tube for conveying light from the lamp;

a window extending across the forward end of the hollow tube for permitting light from the lamp to be transmitted through the window;

a second portion of the lamp housing supporting the reflective tube; and a thru-hull clamping assembly connected to a forward end of the second portion of the lamp housing for mounting the forward end of the second portion of the lamp housing in a hole in the hull of a vessel in a water-tight fashion by squeezing the hull.

79. The thru-hull light of claim 78 and further comprising a glass reflector surrounding the lamp.

80. The thru-hull light of claim 78 wherein the lamp is a hybrid Xenon/HID lamp.

81. A thru-hull light comprising:

a hollow lamp housing having a hollow interior and a forward end configured for mating with a hole in the hull of a vessel;

a thru-hull clamping assembly connected to a forward end of the lamp housing for mounting the forward end of the lamp housing in the hole in the hull of the vessel in a water-tight fashion by squeezing the hull a lamp;

a socket supporting the lamp in the interior of the lamp housing; and a window made of a scratch resistant transparent material extending across and sealing the forward end of the lamp housing for permitting light from the lamp to be transmitted through the window.

82. The thru-hull light of claim 81 and further comprising means for providing a water-tight seal between the window and the forward end of the lamp housing to prevent water from entering the interior of the lamp housing.

83. The thru-hull light of claim 81 and further comprising a reflector mounted in the interior of the lamp housing and surrounding the lamp, the reflector having an outer elliptical section and an inner parabolic section.

84. The thru-hull light of claim 81 and further comprising an end cap and means for securing the end cap to a rearward end of the lamp housing in a water-tight fashion.

85. The thru-hull light of claim 81 and further comprising an electrical circuit connected to the lamp and including means for shutting off a source of power to the lamp upon the detection of a predetermined excessive heat condition.

86. The thru-hull light of claim 81 and further comprising an electrical circuit connected to the lamp and including means for shutting off a source of power to the lamp upon the detection of leakage of water into the lamp housing.

87. The thru-hull light of claim 81 and further comprising an electrical circuit connected to the lamp and including a ballast and means for shutting off a source of power to the ballast in the event of the detection of a fault in the lamp.

88. The thru-hull light of claim 81 wherein the electrical circuit further includes means for indicating power status and/or fault status.

89. The thru-hull light of claim 81 wherein the lamp has a color temperature of at least about five thousand K.

* * * * *